United States Patent
Hatanaka et al.

[11] Patent Number: 6,144,432
[45] Date of Patent: Nov. 7, 2000

[54] REFLECTIVE LIQUID CRYSTAL DISPLAY DEVICE

[75] Inventors: Takayuki Hatanaka; Shingo Fujita; Tetsu Ogawa, all of Ishikawa, Japan

[73] Assignee: Matsushita Electric Industrial Co., Ltd., Osaka, Japan

[21] Appl. No.: 09/479,634

[22] Filed: Jan. 7, 2000

[30] Foreign Application Priority Data

Jan. 7, 1999 [JP] Japan ................................ 11-002345

[51] Int. Cl.⁷ ................................................ G02F 1/1335
[52] U.S. Cl. ............................ 349/119; 349/113; 349/121
[58] Field of Search .............................. 349/113, 119–121

[56] References Cited

U.S. PATENT DOCUMENTS

| | | | |
|---|---|---|---|
| 5,737,047 | 4/1998 | Sakamoto et al. | 349/119 |
| 5,798,809 | 8/1998 | Nakamura et al. | 349/113 |
| 5,995,180 | 11/1999 | Moriwaki et al. | 349/119 |

FOREIGN PATENT DOCUMENTS

| | | |
|---|---|---|
| 06308481 | 11/1994 | Japan . |
| 07146469 | 6/1995 | Japan . |
| 08201802 | 8/1996 | Japan . |

*Primary Examiner*—James A. Dudek
*Attorney, Agent, or Firm*—Ratner & Prestia

[57] ABSTRACT

A reflective liquid crystal display device employing only one sheet of polarizer film, the liquid crystal display device comprising: a liquid crystal cell comprising liquid crystal sealed between a pair of substrates, a polarizer film, two sheets of retardation film, a scattering film, and a specular reflector. The twisting angle of the liquid crystal is between 220° and 260°. The retardation $\Delta nLC \cdot dLC$ of the liquid crystal is between 700 nm and 1000 nm, and the retardation of the retardation films is $|Rfilm(2)-Rfilm(1)| \leq 200$ nm. A specific angular relationship is established among the alignment of the liquid crystal molecules, the slow axis of the two sheets of retardation film, and the absorption axis of the polarizer. This configuration provides the reflective liquid crystal display device with a bright white display, an achromatic black and white display with high contrast, and less dependence on viewing angle.

48 Claims, 5 Drawing Sheets

REFLECTIVE LIQUID CRYSTAL DISPLAY DEVICE

FIELD OF THE INVENTION

The present invention relates to the field of reflective liquid crystal display devices.

BACKGROUND OF THE INVENTION

In response to the rapid increase in use of information and communications equipment including mobile phones, PHSs (Personal Handyphone System), and PDAs (Personal Digital Assistants), an infrastructure for accessing and transmitting information at any time from any place by anybody has gradually become established. Since these types of information and communications equipment are designed specifically for mobile use, there is demand for light, thin display devices requiring low power input. Liquid crystal display devices (hereinafter LCDs) are thus the major type of display devices currently satisfying such demand. A LCDs information by driving liquid crystal molecules with a few volts of effective voltage to change the light transmissivity. Because liquid crystal itself is a non-light-emitting substance, a separate light source is required, which demands much more power than the power required for driving the liquid crystal. A reflective LCD that utilizes ambient light by providing a reflector underneath the LCD achieves a display device with extremely low power consumption while still exploiting the more advantageous characteristics of liquid crystal. The LCD is thus becoming one of the essential displays used in mobile information terminals.

Moreover, as information volume increases, the demand for color displays for mobile information terminals is increasing. Several proposals on the configuration of reflective LCD for color displays have been made, including the use of color filters and the birefringence effect.

A conventional reflective LCD includes a liquid crystal cell and a pair of polarizer films sandwiching the liquid crystal cell. The light transmissivity of one sheet of the polarizer film is only about 45%, and its transmissivity to light polarized parallel to the absorption axis of the polarizer film is close to 0%. The transmissivity of light polarized perpendicular to the absorption axis is almost 90%. In a reflective LCD using two sheets of polarizer film, light entering the LCD passes through polarizer films four times before exiting the LCD. Accordingly, when non-polarized natural light is incident on the LCD, the overall reflectance or light transmissivity can be calculated as follows, without taking absorption by the color filter into consideration:

$$(0.9)^4 \times 50\% = 32.8\%.$$

To achieve a brighter display, configurations using a single polarizer have been proposed. In such single-polarizer configurations, only one sheet of polarizer film may be disposed on the top side of the liquid crystal cell so that the liquid crystal cell is sandwiched by one sheet of the polarizer film and reflector. For example, this configuration is disclosed in the Japanese Laid-open Patent Nos. H8-201802 and H7-146469. In this case, light entering the reflective LCD passes through the polarizer film only twice. The overall reflectance or light transmissivity of a single-polarizer reflective LCD can therefore be calculated as follows:

$$(0.9)^2 \times 50\% = 40.5\%,$$

again without considering absorption by the color filter.

Compared to the configuration using two sheets of polarizer film, single-polarizer configurations therefore provide up to about 24% improvement ($(40.5/32.8) \times 100\% - 100\%$) in overall reflectance.

Furthermore, the Japanese Laid-open Patent No. H6-308481 proposes a reflective color LCD utilizing the birefringence of twisted liquid crystal layer in combination with polarizer film, to generate a color display without using color filters.

Figure 5:
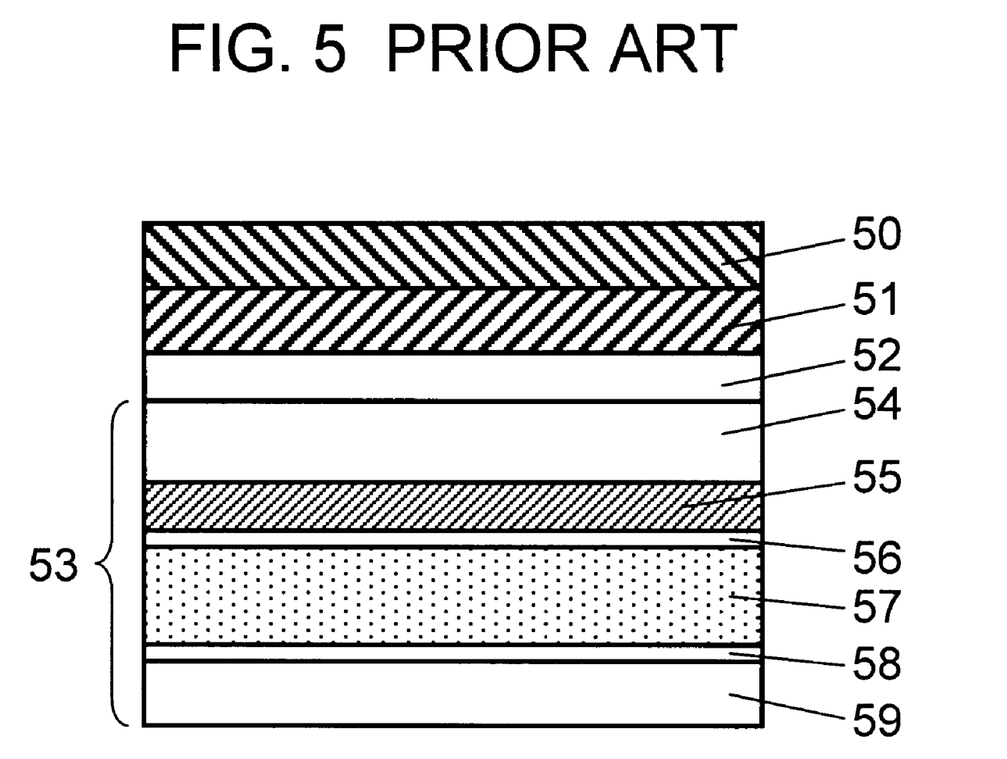
FIG. 5 is a sectional view of a configuration of a conventional reflective LCD.

FIG. 5 shows the configuration of a conventional reflective LCD including one sheet of polarizer film (polarizer) and a color filter. A liquid crystal cell 53 is created by sandwiching a liquid crystal layer 57 between a transparent substrate 54, on which a color filter 55 and transparent electrode 56 are formed, and a bottom substrate 59, on which a specular reflector 58 is formed. A retardation film 52, polarizer 51, and forward scattering film 50 are laminated outside this liquid crystal cell to complete the reflective LCD.

If a color filter is used to create a color display in a reflective LCD configuration having two sheets of polarizer film, the reflectance is insufficient to secure the required display brightness. If, to secure the required brightness by increasing the reflectance, the color filter is used in a reflective LCD configuration having a single sheet of polarizer film, creation of an achromatic black and white display may be difficult. Undesired coloring may occur in the conventional configuration. In particular, an achromatic black display with low reflectance may not be achieved. In addition, the optical characteristics of this type of color display depend to a large degree on the direction of incident light and on the viewing angle. If the reflective LCD having a single polarizer film is influenced to a high degree by viewing angle, its disadvantages are not limited to a narrow viewing angle. More specifically, if the reflectance of a black display increases at certain incident light angles, the optical characteristics may be significantly degraded because controlling the incident light angle in a reflective LCD is much more difficult than for a transmissive LCD.

The reflective LCD utilizing the birefringent characteristics of a twisted liquid crystal layer and polarizer films to achieve a color display without a color filter can secure practical brightness even through two sheets of polarizer film are used because no color filter is employed. However, this configuration may not be theoretically applicable to multi-grayscale and multi-color display such as a 16-grayscale, 4096-color display because coloring is produced by the birefringence effect. This type may also have low color purity and limited color reproduction range.

Even in a black and white reflective LCD not employing a color filter, white display with high reflectance may not be achieved if two sheets of polarizer film are used.

SUMMARY OF THE INVENTION

The present invention aims to provide a color or black and white reflective LCD having bright white display, high contrast, good achromatic black and white display, and satisfactory optical characteristics with less dependence on viewing angle by solving the above disadvantages of the conventional reflective LCD.

A reflective LCD of the present invention comprises a liquid crystal cell in which the liquid crystal layer comprises liquid crystal sealed between a first substrate and a second substrate; a polarizer film disposed on the first substrate side of the liquid crystal cell; two retardation films disposed between the polarizer film and the liquid crystal layer of the liquid crystal cell; one or more scattering films disposed between the polarizer film and the liquid crystal layer; and an optical reflector disposed on the second substrate side of the liquid crystal cell. This reflective LCD satisfies the following conditions. The twisting angle of liquid crystal is between 220° and 260°. The multiple ΔnLC·dLC of birefringence ΔnLC of liquid crystal and liquid crystal layer thickness dLC is between 700 nm and 1000 nm. The retardation R film(i) of each retardation film as defined by formula 1 satisfies the relationship in formula 2, where i=1 for the retardation film relatively closer to the liquid crystal cell, i=2 for the birefringence film relatively farther from the liquid crystal cell, nx(i) is the extraordinary light refractive index, ny(i) is the ordinary light refractive index of each retardation film within the film face, and d(i) is the film thickness.

$$Rfilm(i) = \{nx(i) - ny(i)\} \cdot d(i) \quad (1)$$

$$|Rfilm(2) - Rfilm(1)| \leq 200 \text{ nm} \quad (2)$$

In addition, the reflective LCD satisfies set of formulae 3–5 or set of formulae 8–10:

$$100° \leq \phi F1 - \phi LC \leq 140° \quad (3)$$

$$-70° \leq \phi F2 - \phi F1 \leq -50° \quad (4)$$

$$-70° \leq \phi p - \phi F2 \leq -50° \quad (5)$$

$$75° \leq \phi F1 - \phi LC \leq 115° \quad (8)$$

$$-70° \leq \phi F2 - \phi F1 \leq -50° \quad (9)$$

$$-40° \leq \phi p - \phi F2 \leq 10° \quad (10)$$

where:
øLC=the angle of the alignment direction of the molecules of liquid crystal contacting the first substrate;
øp=the angle of the absorption axis of the polarizer film;
øF1=the angle of optical slow axis (angle of extraordinary light refractive index) of the retardation film relatively closer to the liquid crystal cell; and
øF2=the angle of optical slow axis of the retardation film relatively farther from the liquid crystal cell;
and all angles are measured relative to a reference direction parallel to a face of the liquid crystal cell, and a liquid crystal twisting direction from the second substrate to the first substrate is considered to be a positive direction.

This configuration offers a reflective LCD achieving achromatic black display with sufficiently low reflectance, achromatic white display with high reflectance, and high contrast.

If the refractive index of each of the retardation films is set to satisfy $0 \leq Qz(i) \leq 1.0$, where coefficient Qz is defined as $Qz = \{nx(i) - nz(i)\}/\{nx(i) - ny(i)\}$, and nz(i)=the refractive index perpendicular to the face of the retardation film, dependence of optical characteristics on incident light direction or viewers' direction is reduced, thus achieving achromatic black display having further satisfactory reflectance.

Disposing the optical reflector between the second substrate and the liquid crystal and using a metal film containing aluminum or silver as the optical reflector minimizes occurrence of a double image or parallax because the liquid crystal layer contacts the reflection face. This configuration achieves further satisfactory display images, and at the same time, achieves a white display with high reflectance.

DESCRIPTION OF THE PREFERRED EMBODIMENT

Exemplary embodiments of the present invention are described with reference to drawings.

First Exemplary Embodiment

Figure 1:
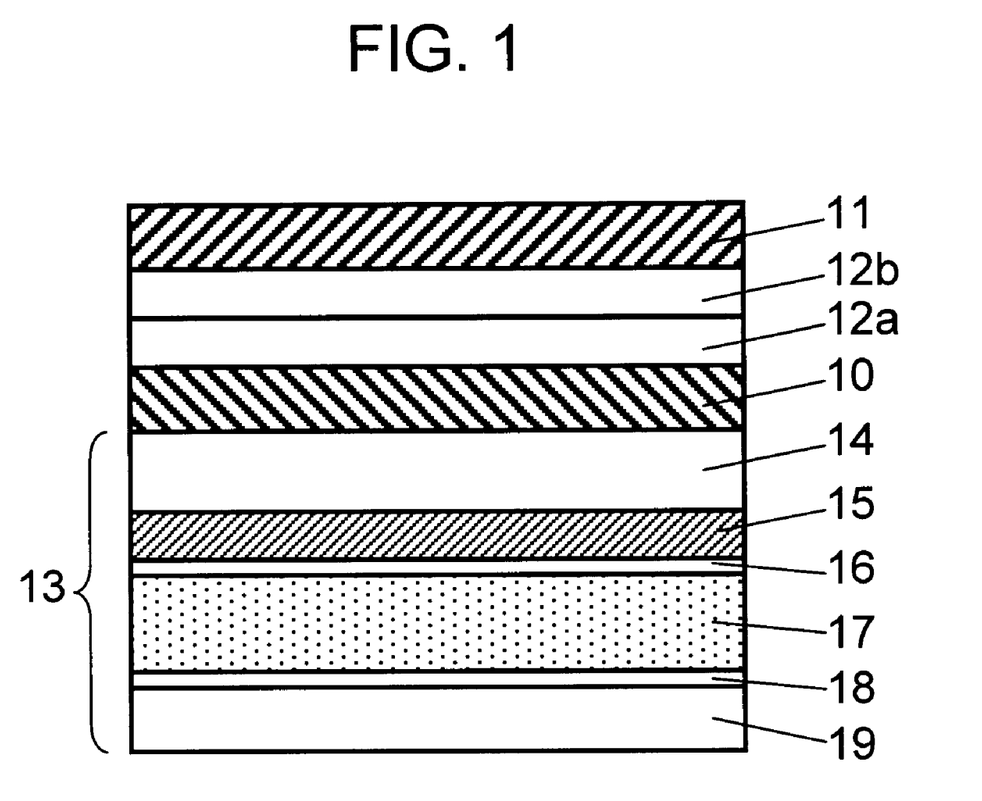
FIG. 1 is a cross-sectional view of a reflective LCD in accordance with first to third exemplary embodiments of the present invention.

FIG. 1 shows a cross-sectional view of a reflective LCD in a first exemplary embodiment of the present invention. As shown in FIG. 1, the present exemplary embodiment is a color reflective LCD employing a single polarizer. A scattering film 10, retardation films 12a and 12b, and a polarizer film 11 are disposed outside a liquid crystal cell 13. Liquid crystal cell 13 includes a liquid crystal layer 17 sandwiched between a bottom substrate 19 on which a specular reflector 18 is formed and a top transparent substrate 14 on which a color filter 15 and transparent electrode 16 are formed. Specular reflector 18 corresponds to the specular reflection means in the present invention.

Figure 2:
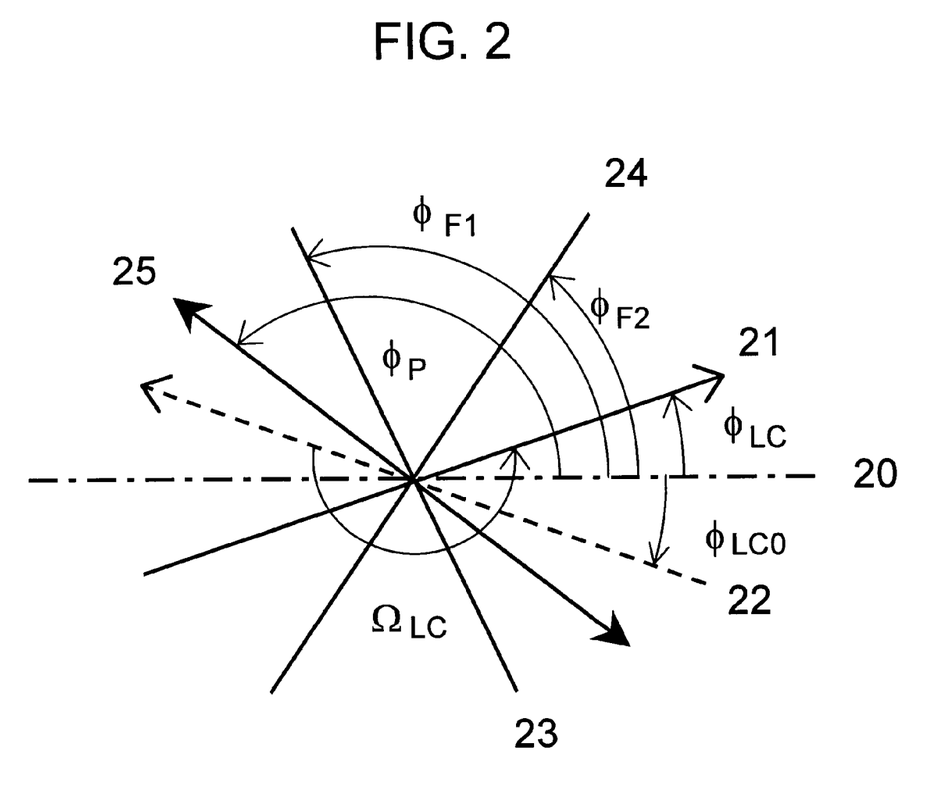
FIG. 2 is an optical configuration of the reflective LCD in accordance with the first to third exemplary embodiments of the present is invention.

FIG. 2 shows the optical configuration of the reflective LCD in the first exemplary embodiment, seen from the polarizer film side of the LCD. A reference line 20 which is parallel to a face of liquid crystal cell 13, alignment direction 21 of liquid crystal molecules contacting the top transparent substrate 14, alignment direction 22 of the liquid crystal molecules contacting the bottom substrate 19, an optical slow axis direction 23 of a retardation film (1) 12a relatively closer to the liquid crystal cell 13, an optical slow axis direction 24 of a retardation film (2) 12b relatively farther from the liquid crystal cell (relatively closer to the polarizer film 11), and an absorption axis direction 25 of the polarizer film 11 are illustrated in FIG. 2. Measured from reference line 20, øLC0 is the angle of alignment direction 22 of liquid crystal molecules on the bottom substrate 19, øLC is the angle of alignment direction 21 of liquid crystal molecules on the top transparent substrate 14, øF1 is the angle of the optical slow axis direction 23 of the retardation film (1) 12a, øF2 is the angle of the optical slow axis direction 24 of the retardation film (2) 12b, and øp is the angle of absorption axis direction 25 of polarizer film 11. ΩLC is the twisting angle of liquid crystal twisted from bottom substrate 19 to top transparent substrate 14. The twisting direction of liquid crystal from bottom substrate 19 to top substrate 14 is considered to be the positive direction; thus all the angles in FIG. 2 are in the positive direction except for øLC0.

A detailed configuration of the reflective LCD in the first exemplary embodiment is described in the sequence of its manufacturing method below.

Glass substrates are used for top transparent substrate 14 and bottom substrate 19. Red, green, and blue pigment dispersion stripes are photolithographically formed on the top transparent substrate 14 as color filter 15. Then, indium tin oxide (ITO) is formed to create transparent electrode 16 as a pixel electrode. A silver evaporation film is deposited on bottom substrate 19 to form specular reflector 18, which is a metal reflection electrode. After forming, an orientation layer (not illustrated) on the faces of transparent electrode 16 and specular reflector 18 contacting liquid crystal layer 17, alignment is conferred by rubbing.

Thermosetting sealing resin containing 1.0 wt % of glass fiber is printed on the periphery of top transparent substrate 14. Resin beads with a predetermined diameter are scattered at the ratio of 200 beads/mm² on bottom substrate 19; top transparent substrate 14 and bottom substrate 19 are bonded together; and the sealing resin is cured at 150° C. Mixed liquid crystal which is made by adding a predetermined amount of chiral material to ester system nematic liquid crystal with $\Delta n=0.14$ is vacuum injected, and the inlet is sealed with UV-setting resin and then cured in ultraviolet rays.

Scattering film 10 is pasted on top transparent substrate 14 of liquid crystal cell 13 formed as described above. Here, as for scattering film 10, a material having a transmissivity of 90% for all lights, isotropic scattering characteristics regardless of angle within the film face, and 55% Hayes percentage for exiting light regardless of the angle of the incident light, is employed. The Hayes percentage is defined as follows:

(Hayes percentage)=(Scattering light transmissivity)/(transmissivity of all lights)×100[%].

Retardation film (1) 12a and retardation film (2) 12b having a respective predetermined retardation Rfilm(i) as defined by formula 1 are then pasted on scattering film 10 in a way that each optical slow axis creates a respective predetermined angle.

$$Rfilm(i)=\{nx(i)-ny(i)\}\cdot d(i) \quad (1)$$

In formula 1, i is a reference numeral 1 or 2 respectively corresponding to the retardation film (1) 12a and retardation film (2) 12b; nx(i) is the respective refractive index of extraordinary light; ny(i) is the respective refractive index of ordinary light; and d(i) is the respective film thickness for each retardation film.

Then as polarizer film 11, such as antiglare treated (AG) neutral gray polarizer film (for example, SQ-1852AP by Sumitomo Chemical Co., Ltd.) is pasted in a way that its absorption axis creates a predetermined angle.

The reflective LCD as manufactured above achieves a bright white display, high contrast, achromatic black and white display, and satisfactory optical characteristics with less dependence on viewing angle, when the following conditions are satisfied:

a) The twisting angle of liquid crystal ($\phi LC0+\phi LC+180°$) is between 220° and 260°;

b) The multiple $\Delta nLC \cdot dLC$ of birefringence $\Delta nLC$ of liquid crystal multiplied by liquid crystal layer thickness dLC (i.e. retardation of the liquid crystal layer) is 700 nm–1000 nm;

c) The retardations Rfilm(1) and Rfilm(2) of retardation film (1) 12a and retardation film (2) 12b satisfy formula 2; and d) Angles $\phi LC$, $\phi p$, $\phi F1$, and $\phi F2$ satisfy the set of formulae 3–5.

$$|Rfilm(2)-Rfilm(1)| \leq 200 \text{ nm} \quad (2)$$

$$100° \leq \phi F1-\phi LC \leq 140° \quad (3)$$

$$-70° \leq \phi F2-\phi F1 \leq -50° \quad (4)$$

$$-70° \leq \phi p-\phi F2 \leq -50° \quad (5)$$

The configuration satisfying the above conditions minimizes coloring which may occur due to the birefringence effect of the liquid crystal while changing the display from black to white, in particular, while applying the OFF voltage for black display. This enables an achromatic black display with low reflectance and achromatic white display with high reflectance to be achieved. Consequently, the present invention offers a color reflective LCD with high contrast and multi-grayscale of high color purity.

The above conditions are determined based on a detailed optical simulation, and their effectiveness was confirmed as follows.

When optical characteristics are measured in the reflection mode while changing $\Delta nLC \cdot dLC$ when $|Rfilm(2)-Rfilm(1)|$ is 150 nm under the conditions that $\phi LC0=35°$, $\phi LC=35°$, $\Omega LC=250°$, $\phi F1=155°$, $\phi F2=95°$, and $\phi p=35°$; it was found that a normally black reflective LCD achieving achromatic black display with low reflectance and achromatic white display with high reflectance is made feasible between 700 nm and 1000 nm. This owes to the feasibility of retardation of the liquid crystal layer sufficient for black and white display and compensation of coloring by birefringence effect of liquid crystal in this range.

As for the twisting angle of liquid crystal, simple matrix driving influences the duty ratio determining the number of displayable electrodes. A larger twisting angle achieves a smaller duty ratio, making it possible to increase the number of electrodes, and in turn, the number of pixels. In the first exemplary embodiment, the achievement of a satisfactory display even when driving at a duty ratio of 1/200 or below is confirmed when the twisting angle of liquid (crystal is set to between 220° and 260°. In particular, the feasibility of driving at a duty ratio of 1/240 or below is confirmed when the twisting angle is set to between 240° and 260°.

Moreover, when retardation Rfilm(1) of the retardation film (1) 12a closer to the liquid crystal cell 13 and retardation Rfilm(2) of the retardation film (2) 12b farther from the liquid crystal cell (closer to the polarizer film 11) satisfy set of formulae 6 and 7, the black reflectance during application of the OFF voltage is made particularly low.

$$450 \text{ nm} \leq Rfilm(1) \leq 600 \text{ nm} \quad (6)$$

$$600 \text{ nm} \leq Rfilm(2) \leq 750 \text{ nm} \quad (7)$$

More specifically, the optical characteristics of the reflective LCD of the present invention when $\Delta nLC \cdot dLC=850$ nm, $Rfilm(1)=500$ nm, $Rfilm(2)=700$ nm, $\phi LC0=35°$, $\phi LC=35°$, $\Omega LC=250°$, $\phi F1=155°$, $\phi F2=95°$, and $\phi p=35°$ are measured as front view characteristics while driving the LCD at the duty ratio of 1/240. In this case, $Rfilm(2)-Rfilm(1)=200$ nm, $\phi F1-\phi LC=120°$, $\phi F2-\phi F1=-60°$, and $\phi p-\phi F2=-60°$, and formula 2 and formulae 3–5 are satisfied.

Satisfactory characteristics with a contrast of 7.5, and a reflectance of white display of 12.5% (converted to the Y level) are achieved. Because achromatic color changes from black to white, display of 4096 colors in 16 grayscale levels is also confirmed.

The retardation $\Delta nLC \cdot dLC$ of liquid crystal layer and retardation Rfilm(i) of retardation films in this exemplary embodiment are defined for retardation against light having a wavelength $\lambda=550$ nm.

Second Exemplary Embodiment

The main configuration and the method for manufacturing a reflective LCD in a second exemplary embodiment are the same as those in the first exemplary embodiment. Accordingly, the second exemplary embodiment is described with reference to the sectional configuration as in FIG. 1 and the optical configuration of the reflective LCD in FIG. 2. One detail that differs from the first exemplary embodiment is the positional relationship of the optical axes of the retardation film and polarizer film and liquid crystal alignment.

The reflective LCD manufactured in accordance with the same manufacturing procedures as described in the first exemplary embodiment achieves a bright white display, high contrast, an achromatic black and white display, and satisfactory optical characteristics with less dependence on viewing angle, when the following conditions are satisfied:

a) The twisting angle of liquid crystal ($øLC0+øLC+180°$) is between 220° and 260°;

b) The multiple $ΔnLC·dLC$ of birefringence $ΔnLC$ of liquid crystal multiplied by liquid crystal layer thickness dLC is 700 nm–1000 nm;

c) The retardations Rfilm(1) and Rfilm(2) of retardation film (1) 12a and retardation film (2) 12b satisfy formula 2; and d) The angles øLC, øp, øF1, and øF2 satisfy the set of formulae 8–10.

$$|Rfilm(2)-Rfilm(1)| \leq 200 \text{ nm} \quad (2)$$

$$75° \leq øF1-øLC \leq 115° \quad (8)$$

$$-70° \leq øF2-øF1 \leq -50° \quad (9)$$

$$-40° \leq øp-øF2 \leq 10° \quad (10)$$

The configuration satisfying the above conditions minimizes coloring, that may occur due to the birefringence effect of the liquid crystal while changing the display from black to white, in particular, while displaying black during application of the OFF voltage. This enables achievement of an achromatic black display with low reflectance and achromatic white display with high reflectance. Consequently, the present invention offers a reflective LCD that achieves color display with high contrast and multi-grayscale of high color purity.

Effectiveness of the above conditions was confirmed in the example as follows.

When optical characteristics are measured in the reflection mode while changing $ΔnLC·dLC$ when |Rfilm(2)-Rfilm(1)| is 100 nm under the conditions that øLC0=35°, øLC=35°, ΩLC=250°, øF1=130°, øF2=70°, and øp=55°; it was found that a normally black reflective LCD achieving achromatic black display with low reflectance and achromatic white display with high reflectance is made feasible between 700 nm and 1000 nm. This owes to the feasibility of retardation of the liquid crystal layer sufficient for black and white display and compensation of coloring by birefringence effect of liquid crystal in this range.

With the above conditions satisfied (i.e., formula 2), it was confirmed that halftone display colors practically change within the range of achromatic color while applied voltage changes from black display to white display.

Moreover, when retardation Rfilm(1) of retardation film (1) 12a relatively closer to liquid crystal cell 13 and retardation Rfilm(2) of retardation film (2) 12b relatively farther from liquid crystal cell 13 (closer to polarizer film 11) satisfy formula 11 and 12, the reflectance of black during application of the OFF voltage is made particularly low.

$$300 \text{ nm} \leq Rfilm(1) \leq 500 \text{ nm} \quad (11)$$

$$300 \text{ nm} \leq Rfilm(2) \leq 500 \text{ nm} \quad (12)$$

More specifically, the optical characteristics of the reflective LCD of the present invention are measured as front view characteristics while the LCD is driven at the duty ratio of 1/240, when $ΔnLC·dLC$=850 nm, Rfilm(1)=450 nm, Rfilm(2)=350 nm, øLC0=35°, øLC=35°, ΩLC=250°, øF1=130°, øF2=70°, and øp=55° are satisfied. In this case, Rfilm(2)-Rfilm(1)=200 nm, øF1-øLC=95°, øF2-øF1=-60°, and øp-øF2=-15°, and formula 2 and formula 4 are satisfied.

Satisfactory characteristics with a contrast of 8.5, and a reflectance of white display of 12.0% (converted to the Y level) are achieved. Since achromatic color changes from black to white, display of 4096 colors in 16 grayscale levels is also confirmed.

The retardation $ΔnLC·dLC$ of the liquid crystal layer and the retardation Rfilm(i) of the retardation films in this exemplary embodiment are expressed as retardation against the light having a wavelength λ=550 nm.

Third Exemplary Embodiment

A third exemplary embodiment of the present invention is described with reference to drawings. The main configuration and the manufacturing method in this exemplary embodiment are the same as those of the reflective LCD in the first exemplary embodiment. Accordingly, those which are not specifically described in this exemplary embodiment are the same as those in the first exemplary embodiment. Components given the same numerals as those in the first exemplary embodiment have the same functions as those in the first exemplary embodiment, unless specifically described as being different. The third exemplary embodiment is described with reference to the sectional configuration as in FIG. 1 and optical configuration of the reflective LCD in FIG. 2. The first and second exemplary embodiments employ a single-axis optically anisotropic film with the optical axis within the film face as the retardation films 12a and 12b. However, the third exemplary embodiment employs a double-axis anisotropic film also showing the anisotropic refractive index in the direction perpendicular to the film face.

When the reflective LCD manufactured by procedures described in the first exemplary embodiment satisfy the same conditions as the first exemplary embodiment, and further satisfy the next condition, a reflective LCD with satisfactory optical characteristics having even less dependence on viewing angle can be achieved in addition to the benefits of the reflective LCD achieved in the first exemplary embodiment.

In the third exemplary embodiment, coefficient Qz(i) defined by formula 13 satisfies Formula 14, where the refractive index nz(i) is perpendicular to the respective film face of the retardation film (1) 12a and retardation film (2) 12b.

$$Qz(i)=\{nx(i)-nz(i)\}/\{nx(i)-ny(i)\} \quad (13)$$

$$0.0 \leq Qz(i) \leq 1.0 \quad (14)$$

In the above explanation, the reflective LCD of the present embodiment satisfies the conditions in the first exemplary embodiment and also satisfies formula 14. The effect of the reflective LCD in the second exemplary embodiment and also good optical characteristics with even less dependence on viewing angle are achieved when the third exemplary embodiment satisfies the conditions in the second exemplary embodiment and also satisfies formula 14.

The effectiveness of a configuration satisfying formula 14 was confirmed in the following example.

Figure 3A:
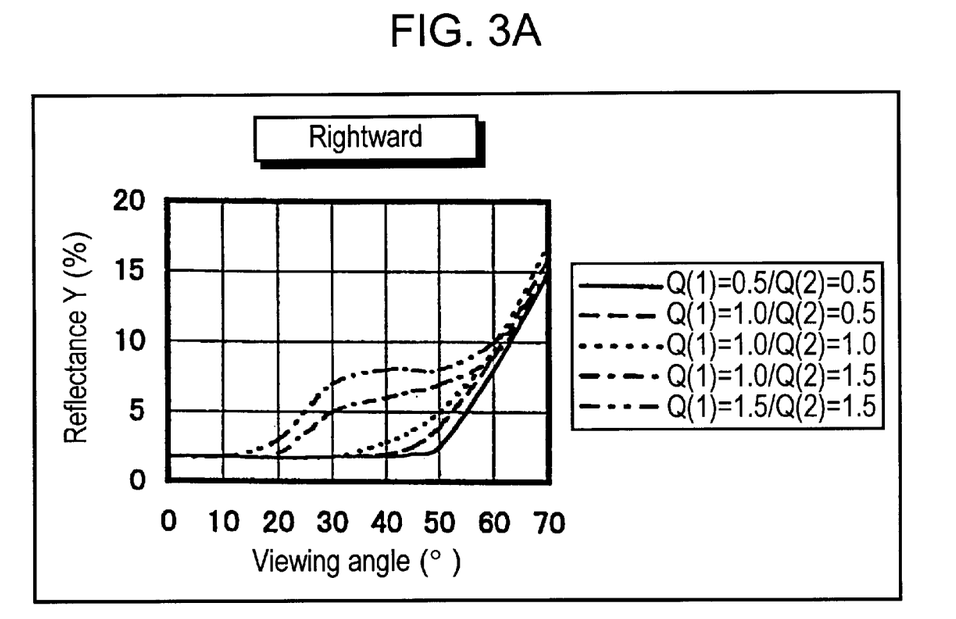
FIGS. 3A and 3B are graphs showing the percent change in the reflectance of a black display versus rightward and downward changes in viewing angle, respectively, when applying the OFF voltage in the reflective LCD in accordance with the third exemplary embodiment of the present invention.
Figure 3B:
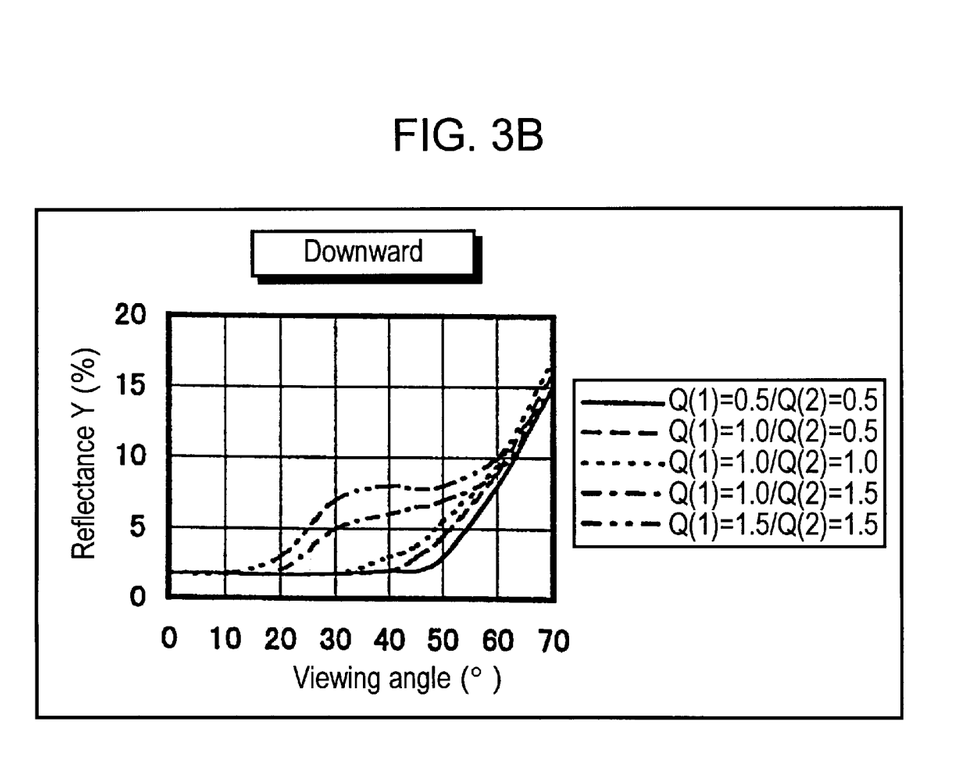

Viewing angle characteristics in black display were measured while changing coefficient Qz(1) of retardation film (1) 12a and coefficient Qz(2) of retardation film (2) 12b from 0.5 to 1.5 respectively under the conditions that $\Delta nLC \cdot dLC=$ 850 nm, Rfilm(1)=500 nm, Rfilm(2)=700 nm, øLC0=35°, øLC=35°, ΩLC=250°, øF1=155°, øF2=95°, and øp=35°. FIGS. 3(a) and 3(b) show the results. FIG. 3A shows the changes in percent reflectance versus rightward viewing angle of a black display while applying the OFF voltage. FIG. 3B shows the change in percent reflectance versus downward viewing angle of a black display while applying the OFF voltage.

In FIGS. 3A and 3B, the reflectance is virtually independent of viewing angle when Qz(2)≦1.0, and when Qz(1) of the retardation film (1) 12a is 1.0.

When comparing characteristics among conditions of Qz(1)=Qz(2)=0.5, Qz(1)=Qz(2)=1.0, and Qz(1)=Qz(2)=1.5, it can be seen that a lower Qz(i) value achieves good reflectance characteristics for display of black with less dependence on viewing angle.

Accordingly, it was confirmed that a reflective LCD with even less dependence on viewing angle is achieved by satisfying formula 14.

The retardation $\Delta nLC \cdot dLC$ of the liquid crystal layer and retardation Rfilm(i) of the retardation films in this exemplary embodiment are expressed as retardation against the light having a wavelength of λ=550 nm.

The reflective LCD of the present invention is not limited to the configurations detailed in the first to third exemplary embodiments. The present invention includes any reflective LCD that includes a liquid crystal cell in which liquid crystal is sandwiched between first and second substrates, a polarizer film is disposed on the first substrate side of the liquid crystal cell, two sheets of retardation film are disposed between the polarizer film and the liquid crystal layer of the liquid crystal cell, one or more scattering films are disposed between the polarizer film and liquid crystal layer, and an optical reflector is disposed on the second substrate side of the liquid crystal cell, and which satisfies the above conditions.

In each exemplary embodiment, silver is used for the specular reflector 18. However, the present invention is not limited to silver. For example, a metal reflective electrode containing aluminum as its component may also be employed to achieve the same effects.

Figure 4A:
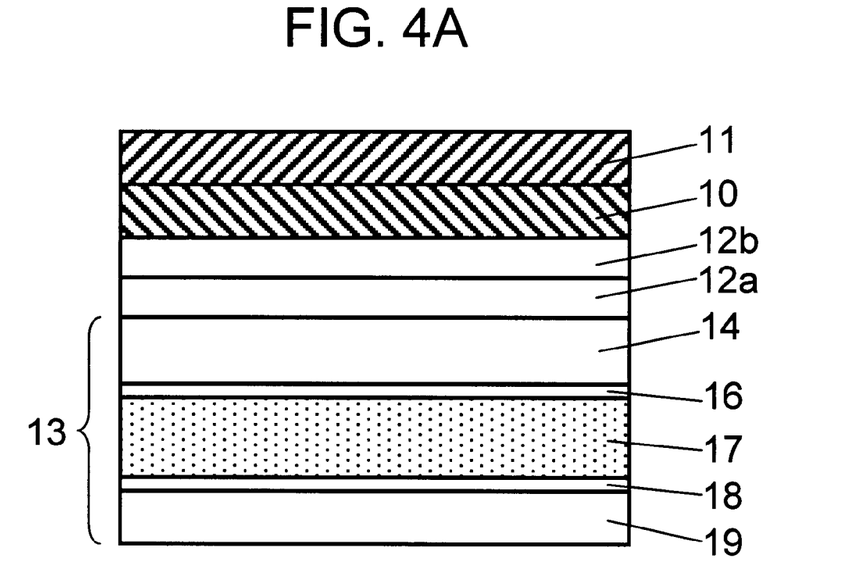
FIGS. 4A and 4B are cross-sectional views showing examples of the scattering film in different positions in the reflective LCD in accordance with the first to third exemplary embodiments of the present invention.
Figure 4B:
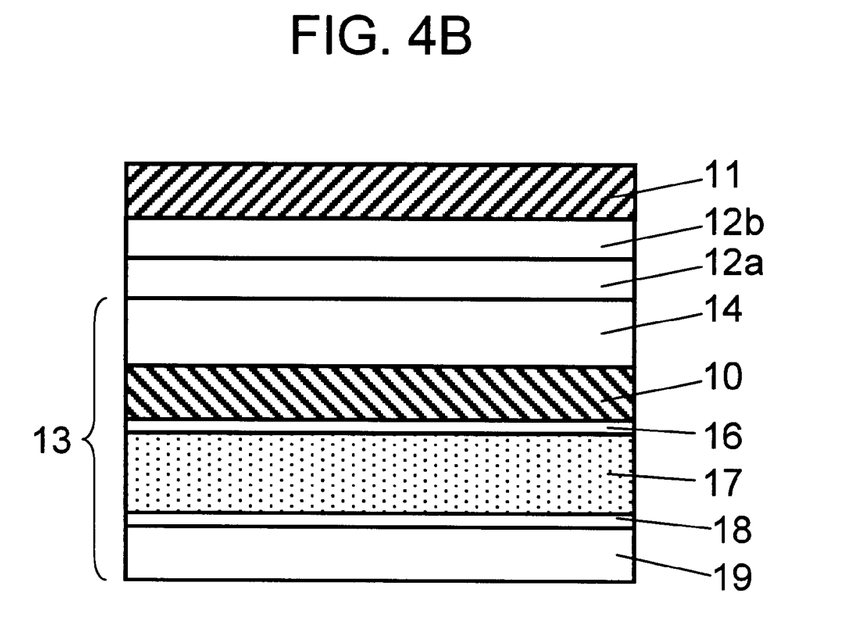

Each exemplary embodiment also employs a material having about 55% Hayes percentage as the scattering film. However, the present invention is not limited to this percentage. For example, a scattering film with 80% Hayes percentage is also applicable. The exemplary embodiments employ a single layer of scattering film. However, the present invention is not limited to this. For example, the same effect is achievable by configuring the scattering film with multiple layers. The scattering film in each exemplary embodiment is disposed at the position shown in FIG. 1. However, the present invention is not necessarily limited to this position. The same effect is also achievable by disposing scattering film 10 for example, between the polarizer film 11 and retardation film (2) 12b, as shown in FIG. 4A, and between the top transparent substrate 14 and transparent electrode 16, as shown in FIG. 4B. In other words, the present invention includes any reflective LCD having a liquid crystal twisting angle of between 220° and 260°, the multiple $\Delta nLC \cdot dLC$ of birefringence $\Delta nLC$ of liquid crystal multiplied by liquid crystal layer thickness dLC between 700 nm and 1000 nm, and the relationship described in formula 2 and either set of formulae 3–5 or 8–10; and including a liquid crystal cell in which liquid crystal is sandwiched between first and a second substrates, a polarizer film disposed at the first substrate side of the liquid crystal cell, two sheets of retardation films disposed between the polarizer film and liquid crystal layer of the liquid crystal cell, one or more scattering films disposed between the polarizer film and liquid crystal layer, and an optical reflector disposed at the second substrate side of the liquid crystal cell.

As described above, the present invention offers a reflective LCD having bright white display, high contrast, achromatic black and white display, and satisfactory optical characteristics with less dependence on viewing angle. Accordingly, the present invention achieves significant effects in displaying multi-grayscale color images with high contrast and good color purity in addition to displaying achromatic black with sufficiently low reflectance and achromatic white with high reflectance.

REFERENCE NUMERALS 10 scattering film
11 polarizer film
12a retardation film (1)
12b retardation film (2)
13 liquid crystal cell
14 top transparent substrate
15 color filter
16 transparent electrode
17 liquid crystal layer
18 specular reflector
19 bottom substrate
20 reference line
21 alignment direction of liquid crystal contacting top transparent substrate
22 alignment direction of liquid crystal contacting bottom substrate
23 slow axis direction of retardation film at the liquid crystal cell side
24 slow axis direction of retardation film at the polarizer film side
25 absorption axis direction of polarizer film

What is claimed is:

1. A reflective liquid crystal display device comprising:
   a liquid crystal cell comprising a liquid crystal layer, having a thickness dLC, of liquid crystal, having a birefringence of $\Delta nLC$, sealed between a first substrate and a second substrate, the liquid crystal cell having a first substrate side and a second substrate side;
   a polarizer layer disposed on the first substrate side of said liquid crystal cell;
   two sheets of retardation layer disposed between said polarizer layer and said liquid crystal layer;
   at least one scattering layer disposed between said polarizer layer and said liquid crystal layer; and
   an optical reflector disposed on the second substrate side of the said liquid crystal layer;

wherein a twisting angle of said liquid crystal is between 220° and 260°, a multiple ΔnLC·dLC of said birefringence ΔnLC of said liquid crystal multiplied by said liquid crystal layer thickness dLC is between 700 nm and 1000 nm, and the liquid crystal display device satisfies formula 2 and one of set of formulae 3–5 or set of formulae 8–10:

$$|Rfilm(2)-Rfilm(1)| \leq 200 \text{ nm} \quad (2)$$

$$100° \leq \phi F1 - \phi LC \leq 140° \quad (3)$$

$$-70° \leq \phi F2 - \phi F1 \leq -50° \quad (4)$$

$$-70° \leq \phi p - \phi F2 \leq -50° \quad (5)$$

$$75° \leq \phi F1 - \phi LC \leq 115° \quad (8)$$

$$-70° \leq \phi F2 - \phi F1 \leq -50° \quad (9)$$

$$-40° \leq \phi p - \phi F2 \leq 10° \quad (10)$$

where:
- Rfilm(i) (retardation in retardation layer i)={nx(i)−ny(i)}·d(i)
- i=1 for the retardation layer relatively closer to said liquid crystal cell;
- i=2 for the retardation layer relatively farther from said liquid crystal cell;
- nx(i)=an extraordinary light refractive index of retardation layer i within a face of the layer;
- ny(i)=an ordinary light refractive index of retardation layer i;
- d(i)=a thickness of retardation layer i;
- øLC=an angle of an alignment direction of molecules of said liquid crystal contacting said first substrate;
- øp=an angle of an absorption axis of said polarizer layer;
- øF1=an angle of slow axis direction of said retardation layer relatively closer to said liquid crystal cell; and
- øF2=an angle of slow axis direction of said retardation layer relatively farther from said liquid crystal cell;
  wherein all angles are measured from a reference direction parallel to a face of said liquid crystal cell, and a twisting direction of said liquid crystal from said second substrate to said first substrate is considered to be a positive direction.

2. The reflective liquid crystal display device of claim 1, wherein Rfilm(i) further satisfies the following formulae 6 and 7 and angles øLC, øp, øF1, and øF2 satisfy set of formulae 3–5:

$$450 \text{ nm} \leq Rfilm(1) \leq 600 \text{ nm} \quad (6)$$

$$600 \text{ nm} \leq Rfilm(2) \leq 750 \text{ nm} \quad (7).$$

3. The reflective liquid crystal display device of claim 1, wherein Rfilm(i) further satisfies the following formulae 11 and 12 and angles øLC, øp, øF1, and øF2 satisfy set of formulae 8–10:

$$300 \text{ nm} \leq Rfilm(1) \leq 500 \text{ nm} \quad (11)$$

$$300 \text{ nm} \leq Rfilm(2) \leq 500 \text{ nm} \quad (12).$$

4. The reflective liquid crystal display device of claim 1, wherein said twisting angle of liquid crystal is between 240° and 260°.

5. The reflective liquid crystal display device of claim 2, wherein said twisting angle of liquid crystal is between 240° and 260°.

6. The reflective liquid crystal display device of claim 3, wherein said twisting angle of liquid crystal is between 240° and 260°.

7. The reflective liquid crystal display device of claim 1, wherein coefficient Qz(i) of each of said retardation layers as defined by formula 13 satisfies formula 14:

$$Qz(i) = \{nx(i)-nz(i)\}/\{nx(i)-ny(i)\} \quad (13)$$

$$0.0 \leq Qz(i) \leq 1.0 \quad (14)$$

where nz(i) is a refractive index of said retardation layers perpendicular to a face of said layer.

8. The reflective liquid crystal display device of claim 2, wherein coefficient Qz(i) of each of said retardation layers defined by formula 13 satisfies formula 14:

$$Qz(i) = \{nx(i)-nz(i)\}/\{nx(i)-ny(i)\} \quad (13)$$

$$0.0 \leq Qz(i) \leq 1.0 \quad (14)$$

where nz(i) is a refractive index of said retardation layer perpendicular to a face of said layer.

9. The reflective liquid crystal display device of claim 3, wherein coefficient Qz(i) of each of said retardation layers defined by formula 13 satisfies formula 14:

$$Qz(i) = \{nx(i)-nz(i)\}/\{nx(i)-ny(i)\} \quad (13)$$

$$0.0 \leq Qz(i) \leq 1.0 \quad (14)$$

where nz(i) is a refractive index of said retardation layer perpendicular to a face of said layer.

10. The reflective liquid crystal display device of claim 4, wherein coefficient Qz(i) of each of said retardation layers defined by formula 13 satisfies formula 14:

$$Qz(i) = \{nx(i)-nz(i)\}/\{nx(i)-ny(i)\} \quad (13)$$

$$0.0 \leq Qz(i) \leq 1.0 \quad (14)$$

where nz(i) is a refractive index of said retardation layer perpendicular to a face of said layer.

11. The reflective liquid crystal display device of claim 5, wherein coefficient Qz(i) of each of said retardation layers defined by formula 13 satisfies formula 14:

$$Qz(i) = \{nx(i)-nz(i)\}/\{nx(i)-ny(i)\} \quad (13)$$

$$0.0 \leq Qz(i) \leq 1.0 \quad (14)$$

where nz(i) is a refractive index of said retardation layer perpendicular to a face of said layer.

12. The reflective liquid crystal display device of claim 6, wherein coefficient Qz(i) of each of said retardation layers defined by formula 13 satisfies formula 14:

$$Qz(i) = \{nx(i)-nz(i)\}/\{nx(i)-ny(i)\} \quad (13)$$

$$0.0 \leq Qz(i) \leq 1.0 \quad (14)$$

where nz(i) is a refractive index of said retardation layer perpendicular to a face of said layer.

13. The reflective liquid crystal display device of claim 1, wherein said optical reflector is disposed between said second substrate and said liquid crystal layer.

14. The reflective liquid crystal display device of claim 2, wherein said optical reflector is disposed between said second substrate and said liquid crystal layer.

15. The reflective liquid crystal display device of claim 3, wherein said optical reflector is disposed between said second substrate and said liquid crystal layer.

16. The reflective liquid crystal display device of claim 4, wherein said optical reflector is disposed between said second substrate and said liquid crystal layer.

17. The reflective liquid crystal display device of claim 5, wherein said optical reflector is disposed between said second substrate and said liquid crystal layer.

18. The reflective liquid crystal display device of claim 6, wherein said optical reflector is disposed between said second substrate and said liquid crystal layer.

19. The reflective liquid crystal display device of claim 7, wherein said optical reflector is disposed between said second substrate and said liquid crystal layer.

20. The reflective liquid crystal display device of claim 8, wherein said optical reflector is disposed between said second substrate and said liquid crystal layer.

21. The reflective liquid crystal display device of claim 9, wherein said optical reflector is disposed between said second substrate and said liquid crystal layer.

22. The reflective liquid crystal display device of claim 10, wherein said optical reflector is disposed between said second substrate and said liquid crystal layer.

23. The reflective liquid crystal display device of claim 11, wherein said optical reflector is disposed between said second substrate and said liquid crystal layer.

24. The reflective liquid crystal display device of claim 12, wherein said optical reflector is disposed between said second substrate and said liquid crystal layer.

25. The reflective liquid crystal display device of claim 1, wherein said optical reflector comprises a metal reflection layer comprising one of aluminum or silver.

26. The reflective liquid crystal display device of claim 2, wherein said optical reflector comprises a metal reflection layer comprising one of aluminum or silver.

27. The reflective liquid crystal display device of claim 3, wherein said optical reflector comprises a metal reflection layer comprising one of aluminum or silver.

28. The reflective liquid crystal display device of claim 4, wherein said optical reflector comprises a metal reflection layer comprising one of aluminum or silver.

29. The reflective liquid crystal display device of claim 5, wherein said optical reflector comprises a metal reflection layer comprising one of aluminum or silver.

30. The reflective liquid crystal display device of claim 6, wherein said optical reflector comprises a metal reflection layer comprising one of aluminum or silver.

31. The reflective liquid crystal display device of claim 7, wherein said optical reflector comprises a metal reflection layer comprising one of aluminum or silver.

32. The reflective liquid crystal display device of claim 8, wherein said optical reflector comprises a metal reflection layer comprising one of aluminum or silver.

33. The reflective liquid crystal display device of claim 9, wherein said optical reflector comprises a metal reflection layer comprising one of aluminum or silver.

34. The reflective liquid crystal display device of claim 10, wherein said optical reflector comprises a metal reflection layer comprising one of aluminum or silver.

35. The reflective liquid crystal display device of claim 11, wherein said optical reflector comprises a metal reflection layer comprising one of aluminum or silver.

36. The reflective liquid crystal display device of claim 12, wherein said optical reflector comprises a metal reflection layer comprising one of aluminum or silver.

37. The reflective liquid crystal display device of claim 13, wherein said optical reflector comprises a metal reflection layer comprising one of aluminum or silver.

38. The reflective liquid crystal display device of claim 14, wherein said optical reflector comprises a metal reflection layer comprising one of aluminum or silver.

39. The reflective liquid crystal display device of claim 15, wherein said optical reflector comprises a metal reflection layer comprising one of aluminum or silver.

40. The reflective liquid crystal display device of claim 16, wherein said optical reflector comprises a metal reflection layer comprising one of aluminum or silver.

41. The reflective liquid crystal display device of claim 17, wherein said optical reflector comprises a metal reflection layer comprising one of aluminum or silver.

42. The reflective liquid crystal display device of claim 18, wherein said optical reflector comprises a metal reflection layer comprising one of aluminum or silver.

43. The reflective liquid crystal display device of claim 19, wherein said optical reflector comprises a metal reflection layer comprising one of aluminum or silver.

44. The reflective liquid crystal display device of claim 20, wherein said optical reflector comprises a metal reflection layer comprising one of aluminum or silver.

45. The reflective liquid crystal display device of claim 21, wherein said optical reflector comprises a metal reflection layer comprising one of aluminum or silver.

46. The reflective liquid crystal display device of claim 22, wherein said optical reflector comprises a metal reflection layer comprising one of aluminum or silver.

47. The reflective liquid crystal display device of claim 23, wherein said optical reflector comprises a metal reflection layer comprising one of aluminum or silver.

48. The reflective liquid crystal display device of claim 24, wherein said optical reflector comprises a metal reflection layer comprising one of aluminum or silver.

* * * * *